No. 769,937. PATENTED SEPT. 13, 1904.
H. J. CASE.
PEA HARVESTER.
APPLICATION FILED APR. 8, 1901.
NO MODEL. 3 SHEETS—SHEET 2.
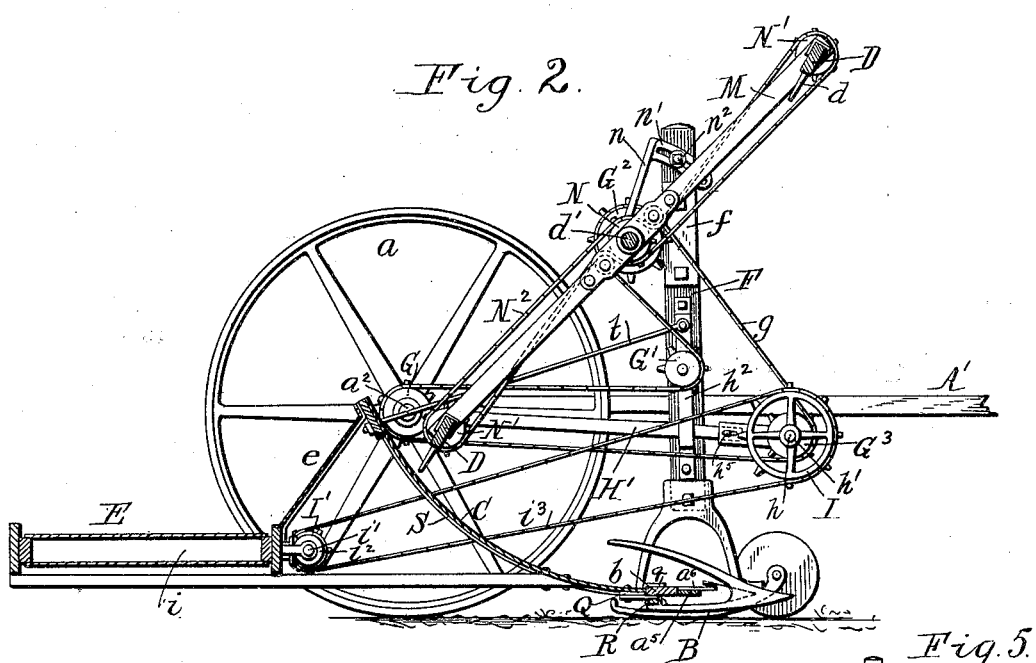
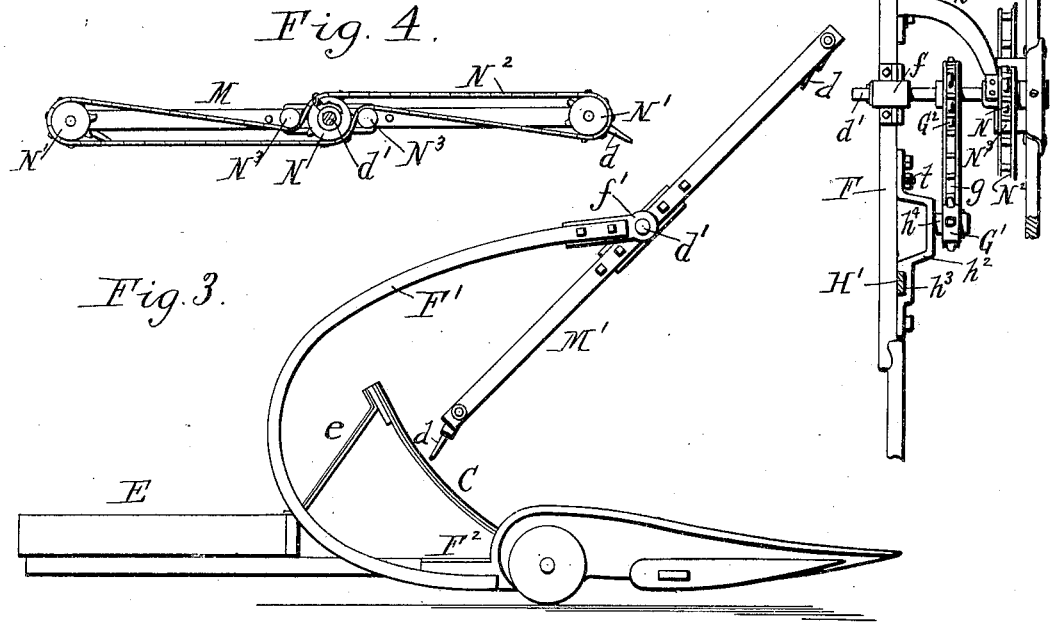
Witnesses:
E. A. Volk.
F. F. Schuzinger
Henry J. Case, Inventor
By Wilhelm Bonner
Attorneys.

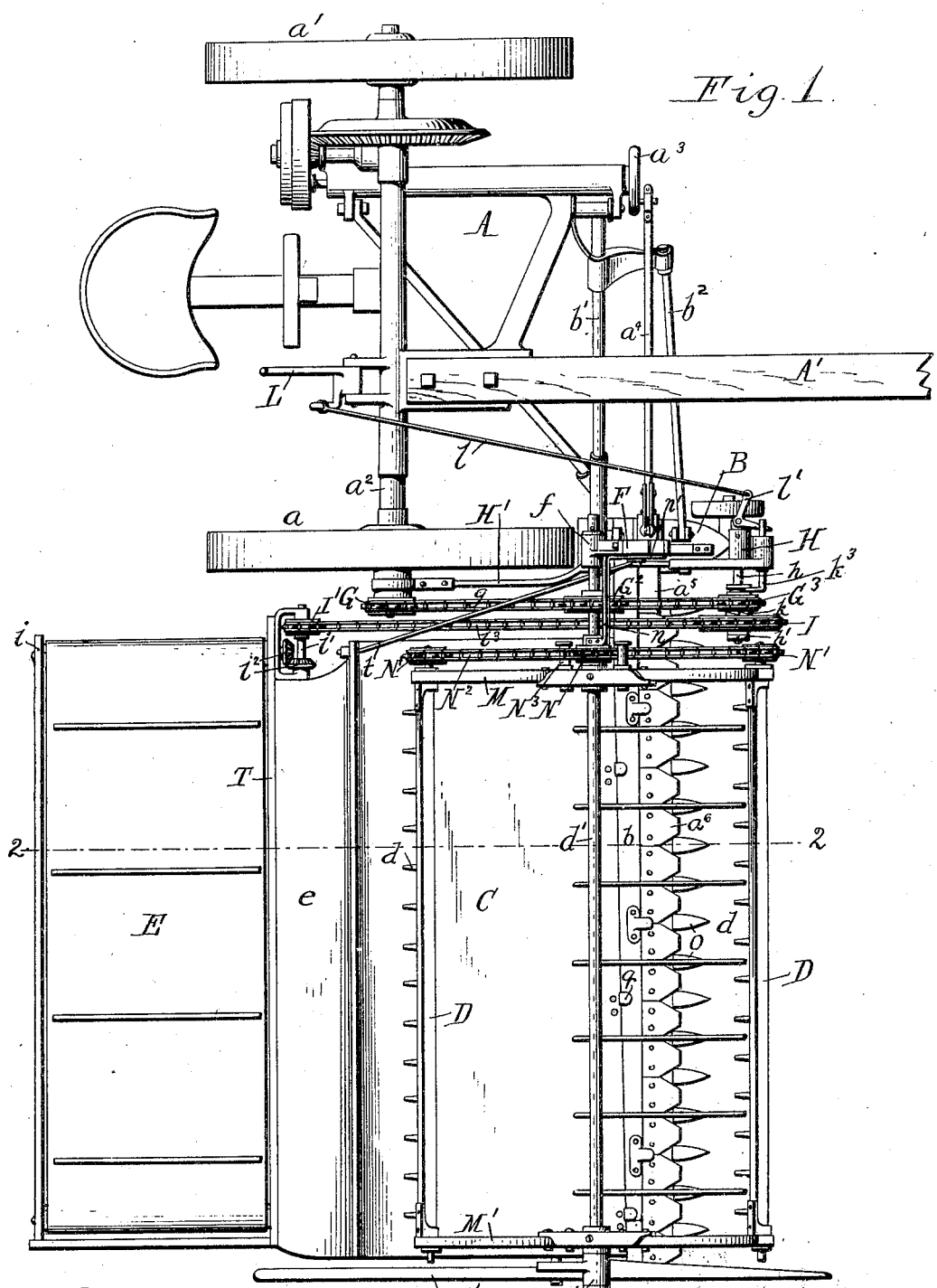

No. 769,937. PATENTED SEPT. 13, 1904.
H. J. CASE.
PEA HARVESTER.
APPLICATION FILED APR. 8, 1901.
NO MODEL. 3 SHEETS—SHEET 3.
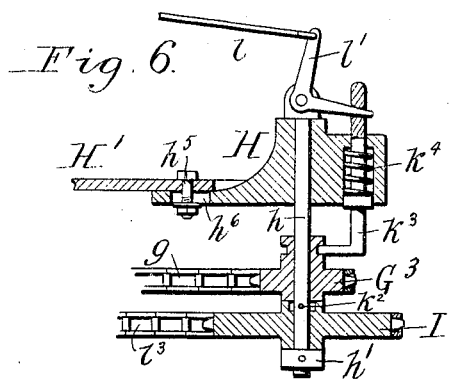
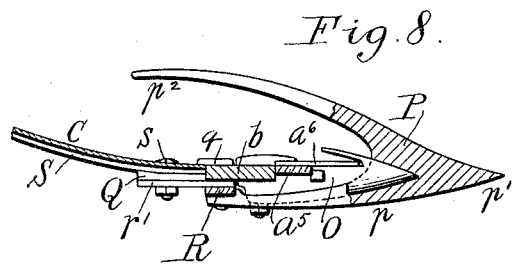
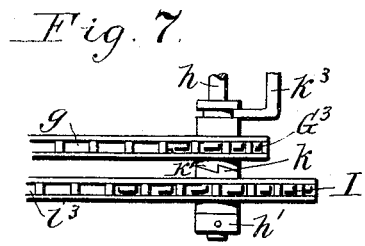
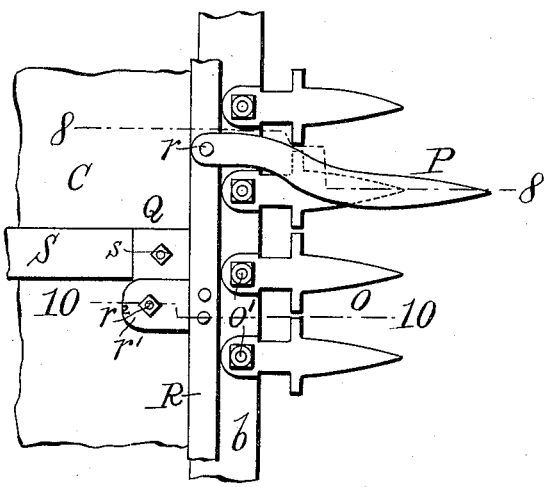
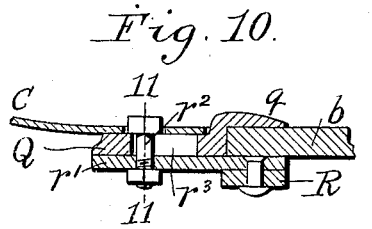
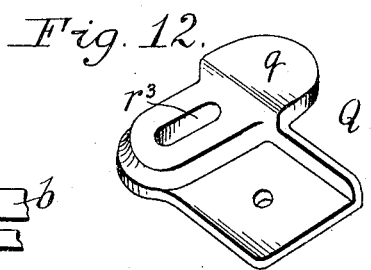
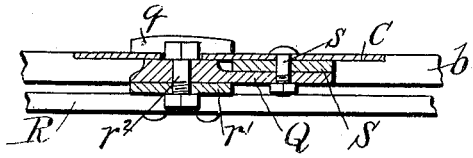
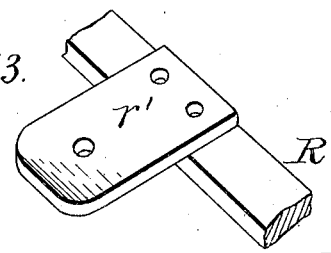
Witnesses:
E. A. Volk
F. F. Schuzinger
Henry J. Case
Inventor
By Wilhelm Bonner
Attorneys No. 769,937.

Patented September 13, 1904.

UNITED STATES PATENT OFFICE.

HENRY J. CASE, OF OWASCO, NEW YORK, ASSIGNOR TO ADRIANCE, PLATT & COMPANY, OF POUGHKEEPSIE, NEW YORK.

PEA-HARVESTER.

SPECIFICATION forming part of Letters Patent No. 769,937, dated September 13, 1904.

Application filed April 8, 1901. Serial No. 54,926. (No model.)

*To all whom it may concern:*

Be it known that I, HENRY J. CASE, a citizen of the United States, residing at Owasco, in the county of Cayuga, in the State of New York, have invented new and useful Improvements in Pea-Harvesters, of which the following is a specification.

This invention relates to a harvesting-machine which is designed more particularly for harvesting green peas on the vines and which embodies a laterally-projecting cutter mechanism suitable for mowing the vines and a horizontal rake or reel by which the standing vines are kept up to the cutter mechanism until cut and are then swept upwardly in rear of the cutter mechanism over a concave elevating-board, which rises rearwardly and from which the vines are delivered upon a transverse traveling apron or platform, by which the vines are discharged in a windrow.

The objects of my invention are to improve the cutter mechanism and the mechanism by which the cut grain is carried away from the cutter mechanism.

In the accompanying drawings, consisting of three sheets, Figure 1 is a top plan view of my improved pea-harvester. Fig. 2 is a vertical longitudinal section in line 2 2, Fig. 1, looking stubbleward. Fig. 3 is a side elevation of the grainward end of the machine. Fig. 4 is a side elevation of the rake and its feathering mechanism looking grainward. Fig. 5 is an elevation of the standard by which the rake-shaft is supported at the inner end of the cutter mechanism looking forward. Fig. 6 is a horizontal section, on an enlarged scale, of the clutch for stopping and starting the traveling apron. Fig. 7 is a top plan view of the clutch. Fig. 8 is a vertical longitudinal section of the cutter mechanism and one of the guard-arms in line 8 8, Fig. 9. Fig. 9 is a fragmentary bottom plan view of the cutter mechanism on an enlarged scale. Fig. 10 is a vertical longitudinal section through one of the clips in line 10 10, Fig. 9, on an enlarged scale. Fig. 11 is a transverse section through the clip in line 11 11, Fig. 10. Fig. 12 is a perspective view of the clip. Fig. 13 is a fragmentary perspective view of the bar and one of the clip-plates.

Like letters of reference refer to like parts in the several figures.

A represents the frame of the machine; A', the pole; $a\,a'$, the ground-wheels; $a^2$, the axle thereof; $a^3$, the crank-wheel; $a^4$, the pitman connecting the latter with the cutter-bar $a^5$, and $a^6$ the cutter-sections. $b$ is the finger-bar, B the shoe at the inner end thereof, and $b'\,b^2$ the usual transverse bars connecting the shoe with the front portion of the frame. All of these parts are constructed and arranged in any well-known or suitable manner.

C represents the concave elevating-board, which rises rearwardly from the cutter mechanism. D represents the horizontal heads or bars of the rotary rake or reel by which the vines are swept upward over this board. These heads or bars are preferably provided with rake-teeth $d$.

E represents the transverse traveling apron or platform conveyer, which is arranged in rear of the concave, receives the vines therefrom, and discharges the same in a windrow near the grainward ground-wheel $a$ of the machine.

$e$ represents an inclined board which conducts the vines from the upper rear end of the concave upon the apron.

F represents a post or standard which is mounted upon the shoe B and which carries on its rear side a bearing $f$ in which the inner portion of the horizontal reel or rake-shaft $d'$ is journaled. The outer end of this shaft is journaled in a bearing $f'$ at the upper end of a curved standard F', rising from the divider $F^2$ at the outer end of the finger-bar. The reel-shaft $d'$ is rotated from the axle $a^2$ of the ground-wheels by a chain $g$, which runs around a sprocket-wheel G on the grainward end of the axle, a guide-wheel G', arranged on the standard F below the rake-shaft $d'$, a sprocket-wheel $G^2$ on the rake-shaft, and a sprocket-wheel $G^3$, which is arranged in front of the standard. The sprocket-wheel $G^3$ is mounted on a stud $h$, having a head $h'$, Figs. 1, 2, 6, and 7. This stud is secured in a socket-piece H, secured to the front end of a longitudinal bar H'. The latter is hung at its rear end concentric with the ground-wheels and extends forwardly on the outer or grainward side of the standard F, against which it is held by an upright strap or bar $h^2$. The front end of the bar H' and the standard can move vertically with the cutter mechanism in following the undulations of the ground. The strap $h^2$ is provided with a loop $h^3$, in which the bar H' is arranged, Fig. 5, and above this loop with a similar loop to which the stud $h^4$ is secured, on which the guide-wheel G' turns. The socket-piece H is secured to the bar H' by a bolt $h^5$, which passes through a longitudinal slot $h^6$, Fig. 6, so that the wheel $G^3$, mounted on the stud $h$, can be adjusted forwardly and backwardly to tighten the chains.

I represents a sprocket-wheel which is mounted on the stud $h$ outside of the sprocket-wheel $G^3$ for driving the apron E. The latter runs at the inner end of the platform around a driving-roller $i$, which is driven from a transverse counter-shaft $i'$, Figs. 1 and 2, by a pair of bevel-wheels $i^2$. The sprocket-wheel I is connected by a chain $i^3$ with a sprocket-wheel I', mounted on the counter-shaft $i'$. The sprocket-wheels $G^3$ and I are provided with interlocking clutch-faces $k\,k'$, Figs. 1, 6, and 7, and the sprocket-wheel $G^3$ is so mounted on the stud that it can be moved toward and from the wheel I for throwing the clutch into and out of engagement. The wheel I is held against outward movement on the stud by the head $h'$ of the latter and against inward movement by a pin $k^2$. The outer clutch-face $k$ is recessed to make room for this pin. The sprocket-wheel $G^3$ is shifted by a horizontal rod $k^3$, which is guided in the socket-piece H and engages at its outer end in an annular groove in the hub of the wheel. This rod is pressed outward to hold the clutch normally in engagement by a spring $k^4$, arranged in the socket-piece. The rod is shifted to disengage the clutch by a foot-lever L, arranged in convenient reach of the driver, and connected by a rod $l$ and bell-crank-lever $l'$ with the shifting-rod $k^3$. When it is desired to stop the apron without stopping the rake, the clutch is disengaged. This is desirable when turning a corner in the field, as it stops the discharge of the grain while doing so, leaving the corner clear and preventing the horses from trampling on the grain. While turning the corner in this manner the rake or reel continues to rotate and the grain accumulates on the apron until the latter is again thrown into gear by releasing the foot-lever.

The horizontal rake-heads D are journaled on diametrically opposite sides of the rake-shaft $d'$ in the ends of radial arms M M', which are secured to said shaft near the inner and outer ends thereof. These heads or bars rotate about the rake-shaft with the arms M M', but are controlled by a mechanism which causes the heads to retain during their rotary movement a certain angle or position with reference to a perpendicular line, which peculiar movement is usually referred to as a "feathering" movement. This feathering mechanism is constructed as follows:

N represents a stationary sprocket-wheel, which is arranged concentric with the rake-shaft between the standard F and the adjacent arm M. N' is a sprocket-wheel secured to each head D on the same side of the reel or rake. $N^2$ is an endless chain which passes around these sprocket-wheels and is held in engagement with the stationary sprocket-wheel by guide-rollers $N^3$, mounted on the arm M on diametrically opposite sides of the stationary sprocket-wheel. The latter is coupled with the sprocket-wheels N' on the heads D by means of the chain and holds the heads in a certain position while the latter rotate about the rake-shaft $d'$. Means are provided for adjusting the stationary sprocket-wheel circumferentially for changing the angle or position of the heads. For this purpose the stationary sprocket-wheel is secured to the standard F by an arm $n$, having a slotted segment $n'$ through which the bolt $n^2$ passes by which the wheel is secured to the standard. The rake-shaft $d'$ passes through the stationary sprocket-wheel and supports the same. Upon loosening the segment and swinging the arm forward or backward the wheel is shifted circumferentially, thereby moving the chain in one direction or the other, turning the sprocket-wheels N' and changing the position of the rake-heads or bars D accordingly.

The concave elevating-board C is curved concentric with the rake-shaft and arranged in such proximity to the path of the rake-heads D that the teeth of the latter sweep the vines upward over the concave face of this board and over the elevated rear end of the latter, whence the vines descend over the inclined board $e$ to the apron E. The position of the rake-heads is so adjusted that they sweep the vines gently over the rear edge of the board and deliver the vines properly upon the apron, but do not throw the vines beyond the latter. The throwing action of the rake-heads is less when the teeth stand perpendicularly than when they stand radially. The desired throwing action is readily secured by adjusting the position of the teeth toward or from the radial position, as may be necessary. For instance, when the rotary speed of the rake is comparatively fast, as when the machine is drawn by a fast-walking team, the throwing action of the rake is comparatively great, and this is counteracted by adjusting the rake-teeth more toward a perpendicular position, while when the rotary speed of the rake is comparatively slow and the throwing action is correspondingly less the throw can be increased by adjusting the teeth more toward a radial position. In this way the throwing action of the rake can be readily adjusted to deliver the vines properly upon the apron and to prevent the vines from being thrown beyond the same.

O represents the ordinary guard-fingers, secured to the finger-bar by bolts O', as usual.

P represents elevated guard arms or horns which project upwardly above the guard-fingers and rearwardly beyond the cutter mechanism for the purpose of carrying the vines clear of the cutters and preventing the pods from being broken by the latter. These guard-arms are less numerous than the guard-fingers, being arranged at greater intervals apart. Each of these guard-arms is arranged in line with one of the guard-fingers and consists of a palm or shank $p$, which is arranged against the under side of the adjacent guard-finger, a point $p'$, which projects forwardly beyond the point of the guard-finger and is provided in its rear side with a socket or recess in which the point of the guard-finger engages, and a guard horn or arm $p^2$, which extends upwardly and rearwardly from the point and terminates beyond the cutter mechanism, so as to guide the vines clear of the cutter mechanism and upon the lower portion of the concave. The palm of the guard-arm is deflected laterally to clear the fastening-bolt O' of the adjacent guard-finger, as shown in Fig. 9. This arrangement of the guard-arms places the palms of the same but slightly below the palms of the ordinary guard-fingers and keeps the finger-bar nearly as closely to the ground as it would be if these guard-arms were not used. As the palms of the guard-arms are arranged below the finger-bar, they do not obstruct the rearward passage of the vines over the finger-bar.

Q represents clips which are secured to the lower or front end of the concave C. These clips abut against the rear side of the finger-bar $b$ and are provided with forwardly-projecting lips $q$, by which they rest upon the finger-bar, Figs. 1, 8 to 12. The palm of each guard-arm P is secured by a bolt $r$ to the under side of a transverse bar R, which is arranged below the rear portion of the finger-bar. This bar is secured to the clips Q and to the concave C by plates $r'$ and bolts $r^2$. The plates $r'$ are secured to the upper side of the bar and project rearwardly therefrom. One of these plates is arranged below each clip. The bolt $r'$ passes through an elongated opening $r^3$ in the clip, which allows the latter to be shifted backward or forward, as may be necessary, to fit it against the back of the finger-bar, which stands at a slight angle to the bar R by reason of the tapering form of the finger-bar. Each clip is secured to the under side of the concave by a bolt or rivet $s$, which serves at the same time to secure the lower end of a longitudinal stiffening-bar S, arranged against the convex lower side of the concave. Each clip Q is depressed on one side of its elongated opening $r^3$, as shown in Figs. 11 and 12, to make room for the lower end of this stiffening-bar.

The concave is supported upon the frame T of the platform conveyer or apron and is connected with the standard F by a brace-rod $t$.

I claim as my invention—

1. The combination of a cutter mechanism, an elevating-board extending rearwardly and upwardly from the same, a transverse conveyer arranged in rear of said board, a rotary rake arranged over said cutter mechanism and board, mechanism whereby said rake is continuously rotated, mechanism whereby said conveyer is actuated from the rake, and a clutch whereby said conveyer-actuating mechanism can be coupled with or uncoupled from said rake-actuating mechanism, substantially as set forth.

2. The combination of a cutter mechanism, an elevating-board extending rearwardly and upwardly from the same, a transverse conveyer arranged in rear of said board, a rotary rake arranged over said cutter mechanism and board, sprocket-wheels and an endless chain whereby said rake is continuously rotated, sprocket-wheels and an endless chain whereby said conveyer is actuated from the rake, and a releasable clutch interposed between adjacent sprocket-wheels of the rake-actuating mechanism and the apron-actuating mechanism, substantially as set forth.

3. The combination of a cutter mechanism, an elevating-board extending rearwardly and upwardly from the same, a transverse conveyer arranged in rear of said board, a rotary rake arranged over said cutter mechanism and board, a sprocket-wheel on the rake-shaft, a driving sprocket wheel and chain for continuously rotating the same, an intermediate sprocket-wheel provided with a clutch-face, a sprocket-wheel for driving the conveyer from the rake arranged adjacent to said intermediate sprocket-wheel and provided with a corresponding clutch-face, means whereby said clutch-faces can be engaged and disengaged, and means whereby motion is transmitted to the conveyer from the driving sprocket-wheel of the same, substantially as set forth.

4. The combination of a cutter mechanism and the shoe at the inner end thereof, a standard supported on said shoe, a rake-shaft journaled on said standard, a sprocket-wheel on said shaft, a laterally-movable intermediate sprocket-wheel supported in front of said standard and provided with a clutch-face, a driving sprocket-wheel, a chain connecting the same with the wheel on the rake-shaft and rotating the intermediate sprocket-wheel, a conveyer arranged in rear of the cutter mechanism, a sprocket-wheel for driving the same arranged adjacent to said intermediate wheel, interlocking clutch-faces arranged on said adjacent sprocket-wheels, and a sprocket wheel and chain whereby said conveyer is driven from said clutch sprocket-wheel, substantially as set forth.

5. The combination with the ground-wheels, a cutter mechanism and the shoe at the inner end of said mechanism, of a standard supported on said shoe, a rake-shaft journaled on said standard and provided with a sprocket-wheel, a driving sprocket-wheel arranged in rear of said standard, a longitudinal bar supported at its rear end concentric with said driving sprocket-wheel and carrying at its vertically-movable front end a stud, an intermediate sprocket-wheel mounted on said stud, a guide-wheel mounted on said standard, and a drive-chain running around said sprocket-wheels and guide-wheel, substantially as set forth.

6. The combination with the ground-wheels, a cutter mechanism and the shoe at the inner end of said mechanism, of a standard supported on said shoe, a rake-shaft journaled on said standard and provided with a sprocket-wheel, a driving sprocket-wheel arranged in rear of said standard, a longitudinal bar supported at its rear end concentric with said driving sprocket-wheel and carrying at its vertically-movable front end a stud, an intermediate sprocket-wheel mounted on said stud, a guide-wheel mounted on said standard, a drive-chain running around said sprocket-wheels and guide-wheel, a conveyer arranged in rear of said cutter mechanism, a sprocket-wheel for driving the conveyer arranged on said stud adjacent to said intermediate sprocket-wheel, clutch-faces formed on said adjacent sprocket-wheels, means for engaging and disengaging said clutch-faces, and a sprocket wheel and chain whereby the conveyer is driven from its driving sprocket-wheel, substantially as set forth.

7. The combination of a cutter mechanism and the shoe at the inner end thereof, a standard supported on said shoe, a rake-shaft journaled on said standard, a sprocket-wheel on said shaft, an intermediate sprocket-wheel, a driving sprocket-wheel, a guide-wheel, a drive-chain running around said wheels, a conveyer arranged in rear of the cutter mechanism, a sprocket-wheel for driving the same arranged adjacent to said intermediate wheel and connected therewith, and a horizontally-adjustable support for said intermediate wheel and the wheel connected therewith, substantially as set forth.

8. The combination with the finger-bar and an elevating-board arranged in rear of the same, of clips having elevated front portions bearing upon the finger-bar and with their rear portions against the under side of said board, and longitudinally-adjustable attaching devices connecting the rear portions of said clips to said board, substantially as set forth.

9. The combination with the finger-bar and guard-fingers, of guard-arms, each arranged with its point in front of the point of a guard-finger and extending from its point upwardly and rearwardly over the finger-bar, and a transverse supporting-bar carrying said guard-arms and arranged below the finger-bar, substantially as set forth.

10. The combination with the finger-bar and guard-fingers, of an elevating-board arranged in rear of the finger-bar, clips secured to the front end of said board and resting upon the finger-bar, a transverse bar secured to said clips below the finger-bar, and guard-arms secured to said transverse bar and extending from the same forwardly beyond the guard-fingers and thence backwardly over the finger-bar, substantially as set forth.

Witness my hand this 2d day of April, 1901.

HENRY J. CASE.

Witnesses:
 HOWARD A. SOMERS,
 C. LOUIS PULSIFER.